(12) United States Patent
Itou

(10) Patent No.: US 10,076,998 B2
(45) Date of Patent: Sep. 18, 2018

(54) IMAGE DISPLAY CONTROL APPARATUS, ELECTRONIC MIRROR SYSTEM, AND IMAGE DISPLAY CONTROL PROGRAM

(71) Applicant: DENSO CORPORATION, Kariya, Aichi-pref. (JP)

(72) Inventor: Kai Itou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/546,703

(22) PCT Filed: Jan. 29, 2016

(86) PCT No.: PCT/JP2016/000456
§ 371 (c)(1),
(2) Date: Jul. 27, 2017

(87) PCT Pub. No.: WO2016/125475
PCT Pub. Date: Aug. 11, 2016

(65) Prior Publication Data
US 2018/0009379 A1    Jan. 11, 2018

(30) Foreign Application Priority Data

Feb. 4, 2015    (JP) ................................ 2015/020329

(51) Int. Cl.
*B60R 1/00*       (2006.01)
*H04N 5/232*     (2006.01)
*G06T 11/60*     (2006.01)

(52) U.S. Cl.
CPC ................ *B60R 1/00* (2013.01); *G06T 11/60* (2013.01); *H04N 5/23293* (2013.01);
(Continued)

(58) Field of Classification Search
CPC ................ B60R 1/00; B60R 2300/105; B60R 2300/8046; B60R 2300/802; G06T 11/60; H04N 5/23293
See application file for complete search history.

(56) References Cited

U.S. PATENT DOCUMENTS 5,742,264 A * 4/1998 Inagaki ................ G02B 27/017
345/7
7,237,641 B2 * 7/2007 Yanai ..................... G08G 1/166
180/271
(Continued)

FOREIGN PATENT DOCUMENTS

JP    2000242896 A    9/2000
JP    2001351125 A    12/2001
(Continued)

*Primary Examiner* — Jose Soto Lopez
(74) *Attorney, Agent, or Firm* — Harness, Dickey & Pierce, P.L.C.

(57) ABSTRACT

An electronic mirror system comprising: an imaging portion that captures an image around a vehicle, and outputs the image to an image display control apparatus; and a display portion that displays an image received from the image display control apparatus. The image display control apparatus comprising: a shift amount calculation portion that calculates a shift amount of an object image that shows an object within an image; a following speed determination portion that determines a following speed of an additional image for the object image; an elapsed time calculation portion that calculates the elapsed time; a shift amount determination portion that determines a shift amount of the additional image; an additional image synthesis portion that synthesizes the additional image to the object image; and a display controller that allows the display portion to display a synthetic image.

6 Claims, 9 Drawing Sheets

(52) U.S. Cl.
CPC ... *B60R 2300/105* (2013.01); *B60R 2300/802* (2013.01); *B60R 2300/8046* (2013.01); *B60R 2300/8066* (2013.01)

(56) References Cited

U.S. PATENT DOCUMENTS

| | | | | |
|---|---|---|---|---|
| 2005/0128061 A1* | 6/2005 | Yanai | ............... | B60R 1/00 340/435 |
| 2008/0151048 A1* | 6/2008 | Watanabe | ............... | B60R 1/00 348/143 |
| 2009/0265061 A1* | 10/2009 | Watanabe | ............... | G08G 1/165 701/36 |
| 2010/0321389 A1* | 12/2010 | Gay | ............... | G11B 27/036 345/427 |
| 2011/0115615 A1* | 5/2011 | Luo | ............... | B60R 1/00 340/436 |
| 2013/0162632 A1* | 6/2013 | Varga | ............... | G06T 19/006 345/419 |
| 2013/0286206 A1 | 10/2013 | Ozaki et al. | | |
| 2015/0062163 A1* | 3/2015 | Lee | ............... | G09G 3/003 345/633 |
| 2015/0154802 A1* | 6/2015 | Song | ............... | G08B 5/00 345/633 |
| 2017/0199049 A1* | 7/2017 | Cho | ............... | G01C 21/365 |

FOREIGN PATENT DOCUMENTS

| | | | |
|---|---|---|---|
| JP | 2011060254 A | 3/2011 | |
| JP | 2013125328 A | 6/2013 | |
| JP | 2013231655 A | 11/2013 | |
| JP | 2014137667 A | 7/2014 | |
| JP | 2014143453 A | 8/2014 | |

* cited by examiner

FIG. 2A FOLLOWING SPEED CONVERSION TABLE A

| N[pic] | S[pic/s] |
|---|---|
| N<50 | S=0 |
| N≥50 | S=50 |

FIG. 2B FOLLOWING SPEED CONVERSION TABLE B

| N[pic] | S[pic/s] |
|---|---|
| N<50 | S=0 |
| 50≤N≤300 | 50≤S≤200 |

FIG. 2C FOLLOWING SPEED CONVERSION TABLE C

| N[pic] | Cs[km/h] | S[pic/s] |
|---|---|---|
| N<50 | – | S=0 |
| N≥50 | 10≤Cs≤100 | 50≤S≤200 |

FIG. 2D FOLLOWING SPEED CONVERSION TABLE D

| N[pic] | Cr[rps] | S[pic/s] |
|---|---|---|
| N<50 | – | S=0 |
| N≥50 | 0.02≤Cr≤0.08 | 50≤S≤200 |

FIG. 2E FOLLOWING SPEED CONVERSION TABLE E

| N[pic] | S1[pic/s] | S2[pic/s] |
|---|---|---|
| N<50 | S1=0 | S2=0 |
| N≥50 | S1=50 | S2=100 |

FIG. 2F FOLLOWING SPEED CONVERSION TABLE F

| N[pic] | S1[pic/s] | S2[pic/s] |
|---|---|---|
| N<20 | S1=0 | S2=0 |
| 20≤N<50 | S1=0 | S2=50 |
| N≥50 | S1=50 | S2=100 |

FIG. 5A WHEN SHIFT AMOUNT OF OBJECT IMAGE = 50 [pic]
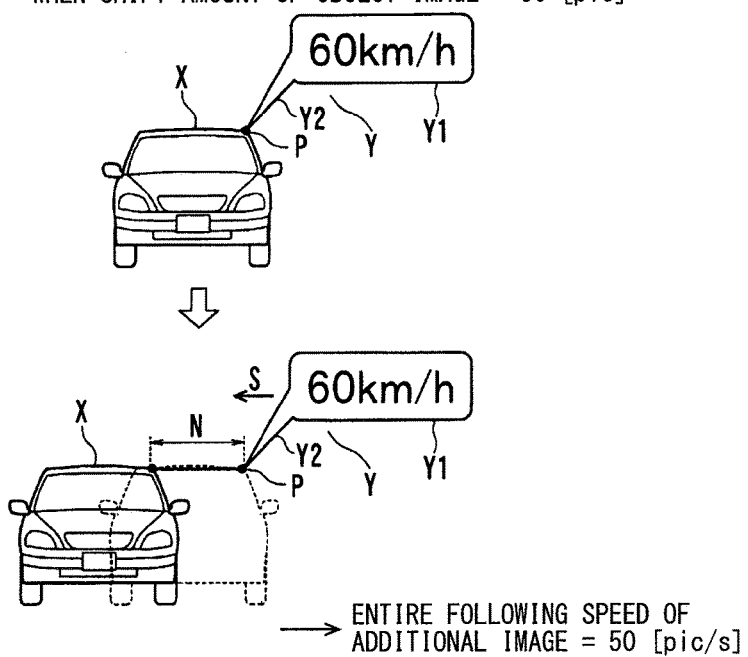
ENTIRE FOLLOWING SPEED OF ADDITIONAL IMAGE = 50 [pic/s]
FIG. 5B WHEN SHIFT AMOUNT OF OBJECT IMAGE = 300 [pic]
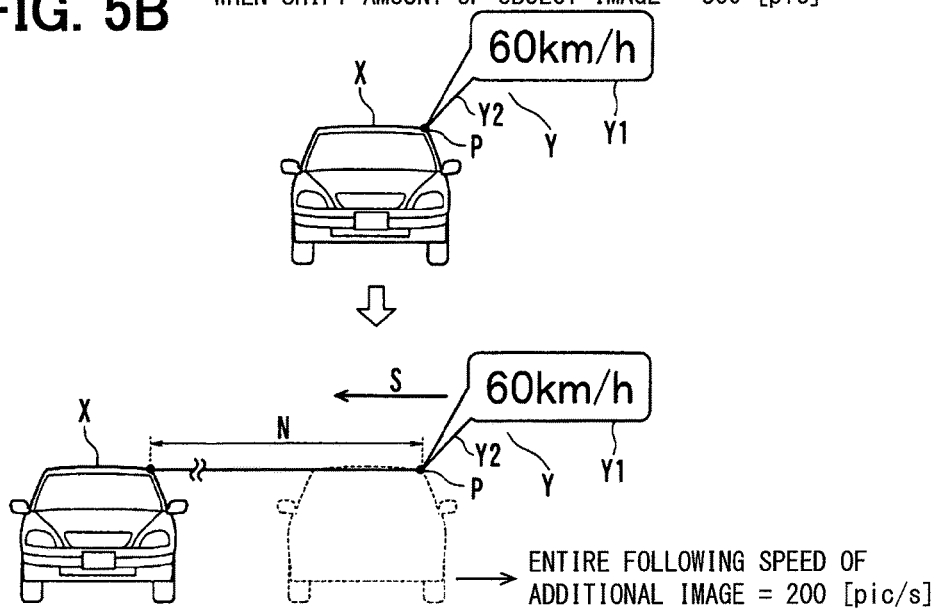
ENTIRE FOLLOWING SPEED OF ADDITIONAL IMAGE = 200 [pic/s]

FIG. 6A WHEN SHIFT AMOUNT OF OBJECT IMAGE ≥ 50 [pic], AND RELATIVE SPEED = 10 [km/h]
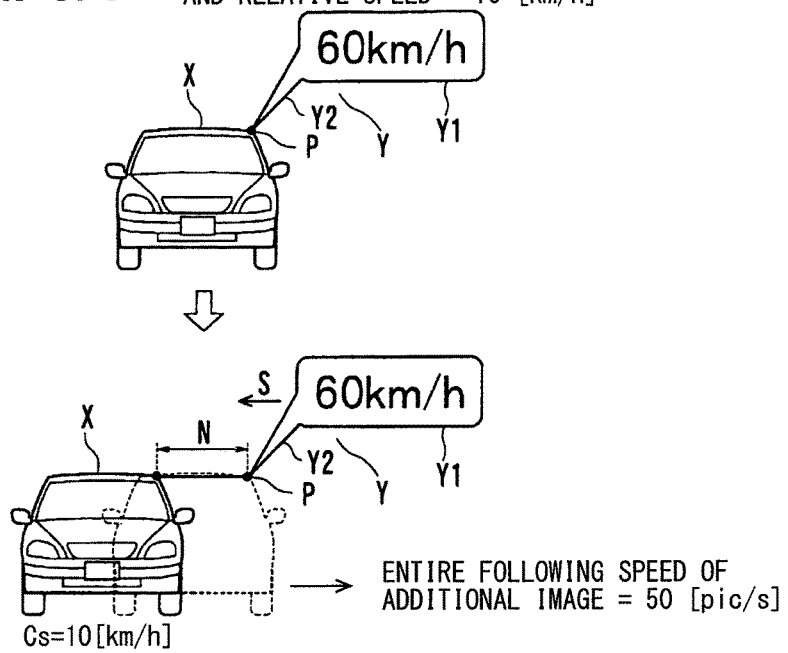
FIG. 6B WHEN SHIFT AMOUNT OF OBJECT IMAGE ≥ 50 [pic], AND RELATIVE SPEED = 100 [km/h]
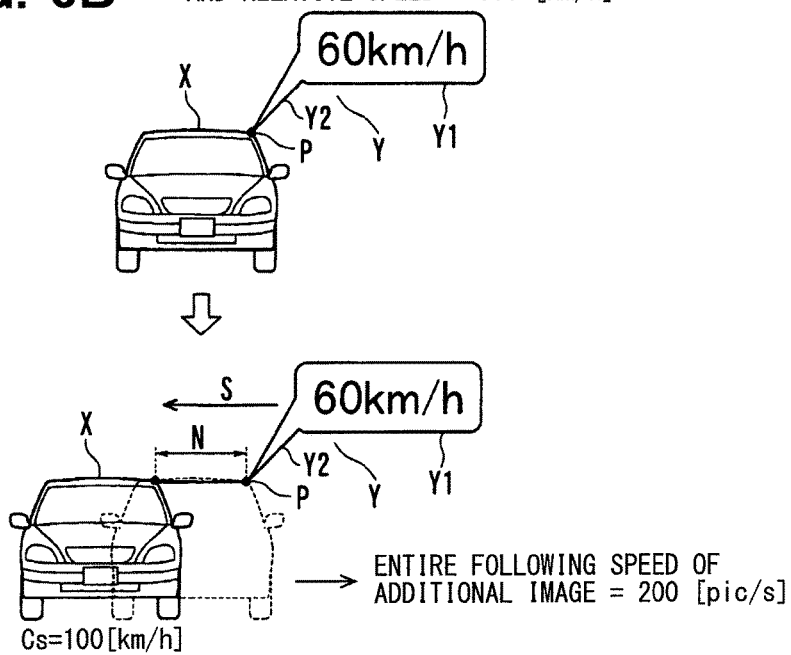

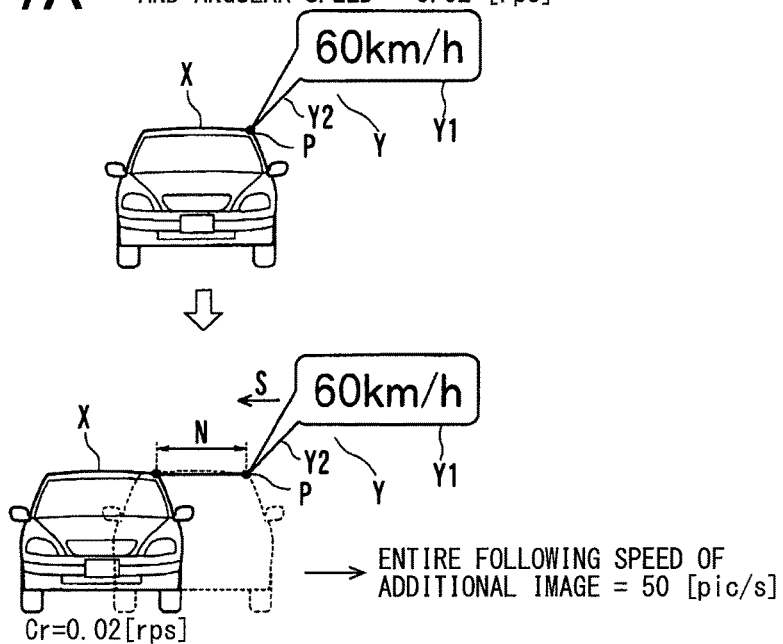
FIG. 7A WHEN SHIFT AMOUNT OF OBJECT IMAGE ≥ 50 [pic], AND ANGULAR SPEED = 0.02 [rps]
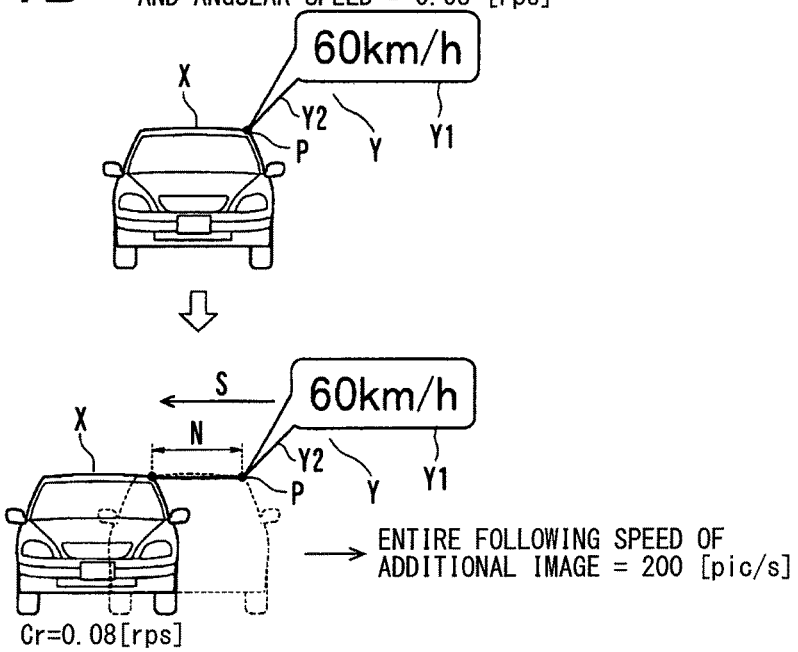
FIG. 7B WHEN SHIFT AMOUNT OF OBJECT IMAGE ≥ 50 [pic], AND ANGULAR SPEED = 0.08 [rps]

FIG. 8A WHEN SHIFT AMOUNT OF OBJECT IMAGE < 50 [pic]
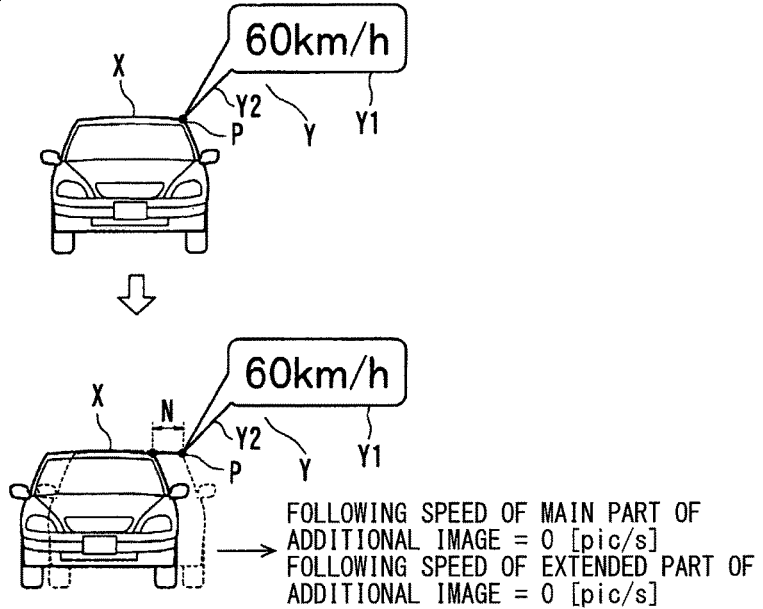
FIG. 8B WHEN SHIFT AMOUNT OF OBJECT IMAGE ≥ 50 [pic]
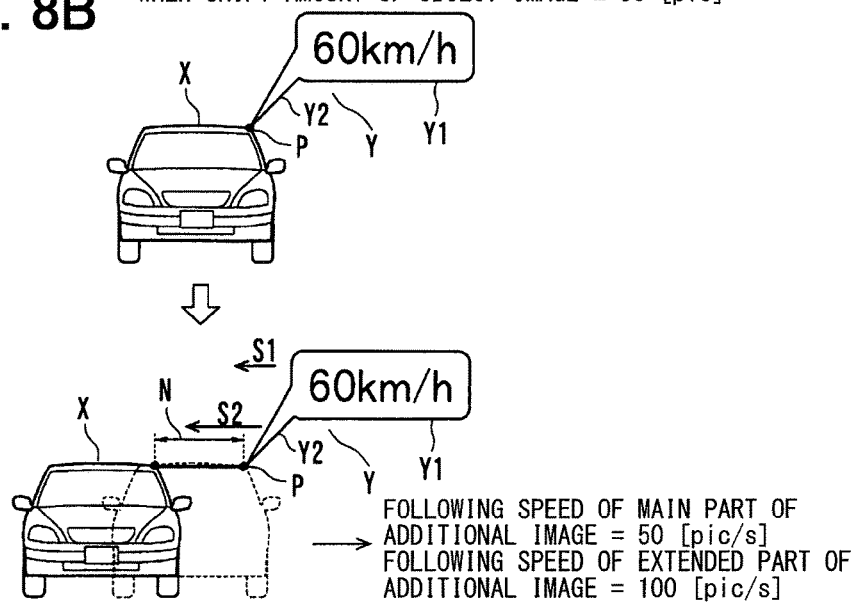

IMAGE DISPLAY CONTROL APPARATUS, ELECTRONIC MIRROR SYSTEM, AND IMAGE DISPLAY CONTROL PROGRAM

CROSS REFERENCE TO RELATED APPLICATIONS

The application is a U.S. National Phase Application under 35 U.S.C. 371 of International Application No. PCT/JP2016/000456 filed on Jan. 29, 2016 and published in Japanese as WO 2016/125475 A1 on Aug. 11, 2016. This application is based on and claims the benefit of priority from Japanese Patent Application No. 2015-20329 filed on Feb. 4, 2015. The entire disclosures of all of the above applications are incorporated herein by reference.

TECHNICAL FIELD

The present disclosure relates to an image display control apparatus that displays a synthetic image produced by synthesizing an additional image to an object image, an electronic mirror system including the image display control apparatus, and an image display control program.

BACKGROUND ART

There has been provided an image display control apparatus configured to synthesize an additional image (such as a balloon image showing a remark of character) to an object image (such as a character image showing a character), and display a synthetic image thus produced (for example, see Patent Literature 1 to Patent Literature 4).

PRIOR ART LITERATURES

Patent Literatures

Patent Literature 1: JP 2001-351125 A
Patent Literature 2: JP 2013-125328 A
Patent Literature 3: JP 2011-60254 A
Patent Literature 4: JP 2013-231655 A

SUMMARY OF INVENTION

A vehicle-mountable electronic mirror system has been spreading in recent years. When the electronic mirror system has a configuration adopting the technology for displaying a synthetic image produced by synthesizing an additional image to an object image, an image to be displayed may be a synthetic image produced by synthesizing an additional image to an object image configured by a following vehicle image, i.e., an image which shows a following vehicle in an image captured on the rear of a vehicle. For example, a vehicle speed of a following vehicle is specified. An image showing the specified vehicle speed of the following vehicle is synthesized as an additional image to display a synthetic image. This synthetic image notifies a user about the vehicle speed of the following vehicle as well as the presence of the following vehicle.

During traveling of the subject vehicle and the following vehicle, both an imaging portion mounted on the subject vehicle and the following vehicle imaged by the imaging portion constantly move relative to each other. Accordingly, shifting (changing display position) of the following vehicle image may be difficult to appropriately follow by the additional image during display by the foregoing configuration. In this case, visibility for a user may deteriorate.

It is an object of the present disclosure to provide an image display control apparatus, an electronic mirror system, and an image display control program for allowing an additional image to appropriately follow and display shifts of an object image, and avoiding deterioration of visibility for a user.

An image display control apparatus according to one aspect of the present disclosure includes a shift amount calculation portion, a following speed determination portion, an elapsed time calculation portion, a shift amount determination portion, an additional image synthesis portion, and a display controller. The shift amount calculation portion calculates a shift amount of an object image that shows an object within an image captured by an imaging portion, the shift amount being an amount of a shift of the object image within a display area of a display portion for a predetermined elapsed time. The following speed determination portion determines a following speed of an additional image for the object image, the following speed being determined based on the shift amount of the object image calculated by the shift amount calculation portion. The elapsed time calculation portion calculates the elapsed time. The shift amount determination portion determines a shift amount of the additional image based on the following speed of the additional image determined by the following speed determination portion and on the elapsed time calculated by the elapsed time calculation portion. The additional image synthesis portion synthesizes the additional image to the object image in accordance with the shift amount of the additional image determined by the shift amount determination portion. The display controller allows the display portion to display a synthetic image produced by synthesizing the additional image to the object image by the additional image synthesis portion.

The shift amount of the additional image is determined based on the following speed of the additional image determined in accordance with the shift amount of the object image when the object image shifts (display position changes) within the display area of the display portion. In other words, the following speed of the additional image is determined not uniformly regardless of the shift amount of the object image, but varied in accordance with the shift amount of the object image. In this case, the additional image appropriately follows the object image during display even in such an environment that the object image is shifting. Accordingly, it may be possible to avoid deterioration of visibility for a user.

An image display control program according to another aspect of the present disclosure causes a controller of an image display control apparatus to execute: calculating a shift amount of an object image that shows an object within an image captured by an imaging portion, the shift amount being an amount of a shift of the object image within a display area of a display portion for a predetermined elapsed time; determining a following speed of an additional image for the object image, the following speed being determined based on the calculated shift amount of the object; calculating the elapsed time; determining a shift amount of the additional image based on the determined following speed of the additional image and on the calculated elapsed time; synthesizing the additional image to the object image in accordance with the determined shift amount of the additional image; and allowing the display portion to display a synthetic image produced by synthesizing the additional image to the object image.

An image display control program according to another aspect of the present disclosure is a program under which a controller of an image display control apparatus executes: calculating a shift amount of an object image that shows an object within an image captured by an imaging portion, the shift amount being an amount of a shift of the object within a display area of a display portion for a predetermined elapsed time; determining a following speed of an additional image formed for the object image, the following speed being determined based on the calculated shift amount of the object; calculating the elapsed time; determining a shift amount of the additional image, based on the determined following speed of the additional image and on the calculated elapsed time; synthesizing the additional image to the object image in accordance with the determined shift amount of the additional image; and allowing a display portion to display a synthetic image produced by synthesizing the additional image to the object image.

According to the present disclosure, an additional image appropriately follows a shift of an object image during display. Accordingly, it may be possible to avoid deterioration of visibility for a user.

BRIEF DESCRIPTION OF DRAWINGS

The above and other aspects, features and advantages of the present disclosure will become more apparent from the following detailed description made with reference to the accompanying drawings. In the drawings:

FIG. 2A is a diagram illustrating an example of a following speed conversion table;

FIG. 2B is a diagram illustrating an example of the following speed conversion table;

FIG. 2C is a diagram illustrating an example of the following speed conversion table;

FIG. 2D is a diagram illustrating an example of the following speed conversion table;

FIG. 2E is a diagram illustrating an example of the following speed conversion table;

FIG. 2F is a diagram illustrating an example of the following speed conversion table;

FIG. 5A is a view illustrating a mode for determining a following speed;

FIG. 5B is a view illustrating a mode for determining a following speed;

FIG. 6A is a view illustrating a mode for determining a following speed;

FIG. 6B is a view illustrating a mode for determining a following speed;

FIG. 7A is a view illustrating a mode for determining a following speed;

FIG. 7B is a view illustrating a mode for determining a following speed;

FIG. 8A is a view illustrating a mode for determining a following speed;

FIG. 8B is a view illustrating a mode for determining a following speed;

DESCRIPTION OF EMBODIMENTS

Figure 1:
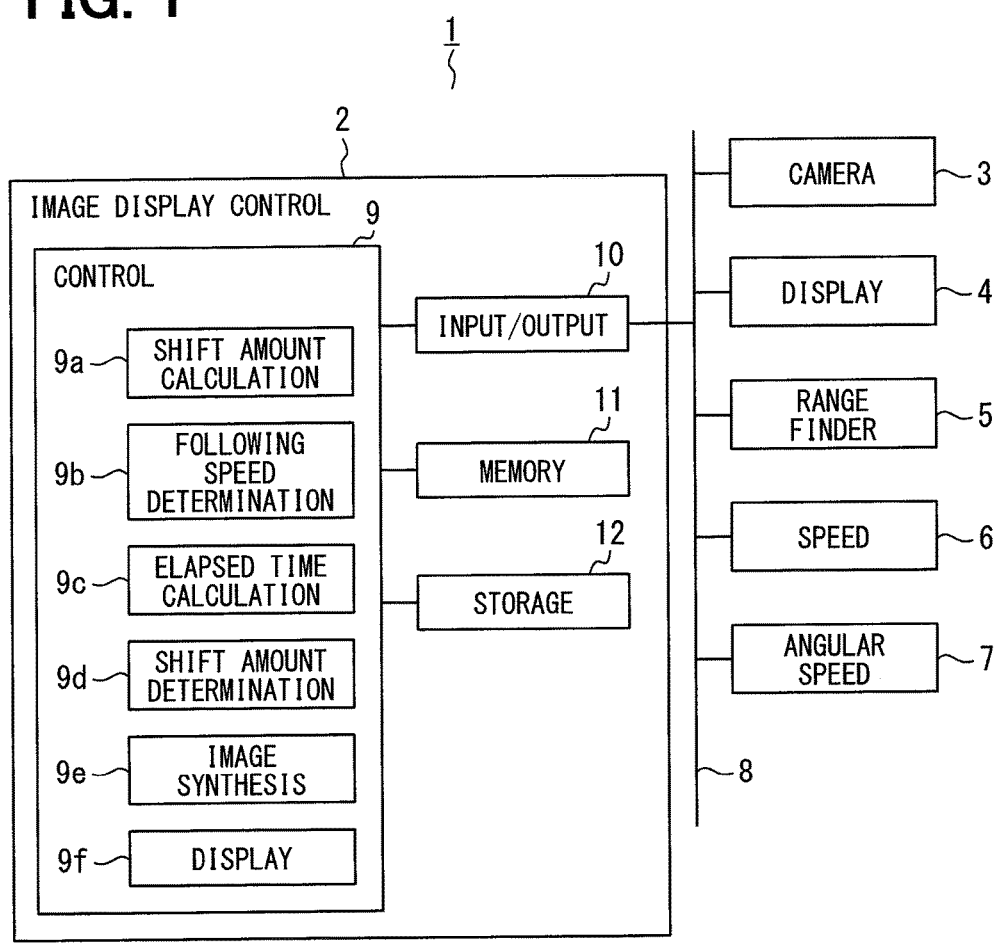
FIG. 1 is a function block diagram illustrating an embodiment of the present disclosure.
Figure 3:
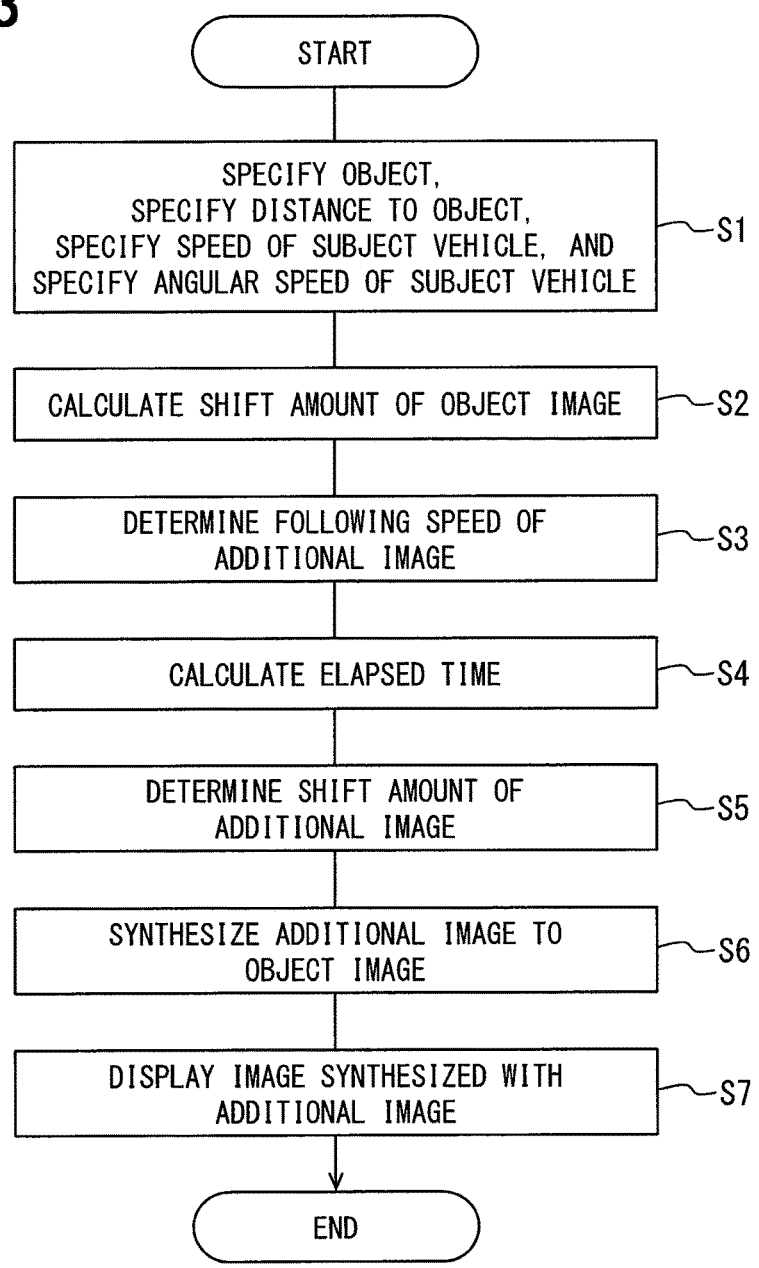
FIG. 3 is a flowchart illustrating an image update process.

A vehicle-mountable electronic mirror system according to an embodiment of the present disclosure is hereinafter described with reference to the drawings. An electronic mirror system 1 images an area of a blind spot for a driver, such as the rear or the side of a vehicle, by using a camera instead of a side mirror provided on the vehicle, such as a fender mirror and a door mirror, and displays an image thus captured on a display device. Since the side mirror, door mirror, and the like are not necessary, the electronic mirror system is advantageous in improved fuel consumption as a result of reduction of air resistance during travel, and advantageous in a higher degree of freedom in vehicle design.

The electronic mirror system 1 is configured by an image display control apparatus 2, a camera 3 (corresponding to imaging portion), a display device 4 (corresponding to display portion), a range finder 5, a speed meter 6, and an angular speed meter 7 connected to each other via a communication bus 8. For example, the electronic mirror system 1 starts in response to switching from an off-state to an on-state of accessory (ACC) signal (shift to wake-up state), and stops in response to switching from the on-state to off-state of the ACC signal.

The camera 3 images the rear and the side of the vehicle, and outputs an imaging signal including an image captured by imaging, to the image display control apparatus 2 via the communication bus 8. The display device 4 having received the imaging signal from the image display control apparatus 2 via the communication bus 8 displays the image included in the imaging signal. The range finder 5 is configured by a laser range finder, a millimeter-wave radar, a stereo camera, a fly-eye camera, or the like. The range finder 5 measures a distance between a subject vehicle (vehicle carrying the electronic mirror system 1) and a following vehicle (a distance between vehicles), and outputs a distance measurement signal including the measured distance to the image display control apparatus 2 via the communication bus 8. The speed meter 6 is configured by a vehicle speed sensor or the like. The speed meter 6 measures a speed of the subject vehicle (vehicle speed), and outputs a speed measurement signal including the measured speed to the image display control apparatus 2 via the communication bus 8. The angular speed meter 7 is configured by a steering angle sensor, a gyro sensor, or the like. The angular speed meter 7 measures an angular speed of the subject vehicle, and outputs an angular speed measurement signal including the measured angular speed to the image display control apparatus 2 via the communication bus 8.

The image display control apparatus 2 includes a controller 9, an input/output interface 10, a memory 11, and a storage medium 12. The controller 9 is configured by a microcomputer including a central processing unit (CPU), a read only memory (ROM), a random access memory (RAM), and an input/output (I/O). The controller 9 executes a computer program (including an image display control program) stored in the memory 11 (corresponds to a non-transitory storage medium) to control an overall operation of the image display control apparatus 2. The input/output interface 10 controls input and output of various types of signals to and from the communication bus 8. The storage medium 12 stores an additional image to be synthesized to an object image (following vehicle image illustrating a following vehicle), and stores following speed conversion tables for determining a following speed of the additional image.

According to the present disclosure, the storage medium 12 stores multiple following speed conversion tables different for each of methods for determining a following speed as illustrated in FIGS. 2A to 2F. The controller 9 determines a following speed of an additional image, based on the following speed conversion tables stored in the storage medium 12. The following speed conversion tables will be described. It is supposed that a shift amount of an object image is N [pic], an entire following speed of an additional image is S [pic/s], a part of the following speed of the additional image is S1 [pic/s], a remaining part of the following speed of the additional image is S2 [pic/s], a relative speed of a subject vehicle to a following vehicle is Cs [km/h], and angular speed acting in the traveling direction of the subject vehicle is Cr [rps]. Numerical values illustrated in FIGS. 2A to 2F are presented by way of example.

A following speed conversion table A is a table for determining S based on N on the assumption that the entire following speed of the additional image is kept constant. The controller 9 using the following speed conversion table A sets S to 0 [pic/s] when N<50 [pic] (smaller than predetermined amount), and sets S to 50 [pic/s] when N≥50 [pic] (predetermined amount or more), for example. A following speed conversion table B is a table for determining S based on N on the assumption that the entire following speed of the additional image is kept constant. The controller 9 using the following speed conversion table B sets S to 0 [pic/s] when N<50 [pic], and sets S in accordance with N when N≥50 [pic] such that a proportional relationship is maintained in a range 50≤S≤200 [pic/s] when 50≤N≤300 [pic].

A following speed conversion table C is a table for determining S based on N and Cs on the assumption that the entire following speed of the additional image is kept constant. The controller 9 using the following speed conversion table C sets S to 0 [pic/s] regardless of Cs when N<50 [pic], and sets S in accordance with Cs when N≥50 [pic] such that a proportional relationship is maintained in a range 50≤S≤200 [pic/s] when 10≤Cs≤100 [km/h]. A following speed conversion table D is a table for determining S based on N and Cr on the assumption that the entire following speed of the additional image is kept constant. The controller 9 using the following speed conversion table D sets S to 0 [pic/s] regardless of Cr when N<50 [pic], and sets S in accordance with Cr when N≥50 [pic] such that a proportional relationship is maintained in a range 50≤S≤200 [pic/s] when 0.02≤Cr≤0.08 [rps].

A following speed conversion table E is a table for determining S1 and S2 based on N on the assumption that the following speed of the additional image is partially varied. The controller 9 using the following speed conversion table E sets both S1 and S2 to 0 [pic/s] when N<50 [pic], and sets S1 and S2 to 50 [pic/s] and 100 [pic/s], respectively, when N≥50 [pic]. A following speed conversion table F is a table for determining S1 and S2 based on N on the assumption that the following speed of the additional image is partially varied. The controller 9 using the following speed conversion table F sets both S1 and S2 to 0 [pic/s] when N<20 [pic], sets S1 and S2 to 0 [pic/s] and 50 [pic/s], respectively, when 20≤N<50 [pic], and sets S1 and S2 to 50 [pic/s] and 100 [pic/s], respectively, when N≥50 [pic].

The controller 9 includes a shift amount calculation portion 9a, a following speed determination portion 9b, an elapsed time calculation portion 9c, a shift amount determination portion 9d, an additional image synthesis portion 9e, and a display controller 9f. Each of the shift amount calculation portion 9a, the following speed determination portion 9b, the elapsed time calculation portion 9c, the shift amount determination portion 9d, the additional image synthesis portion 9e, and the display controller 9f is configured by the above-described computer programs executed by the controller 9, and realized by software.

The shift amount calculation portion 9a having received an imaging signal from the camera 3 analyzes an image included in the received imaging signal, and calculates a shift amount of a following vehicle image showing a following vehicle in the image for a predetermined elapsed time within a display area of the display device 4 as a shift amount of the following vehicle image. The following speed determination portion 9b determines a following speed of an additional image based on the following speed conversion tables stored in the storage medium 12. The elapsed time calculation portion 9c calculates an elapsed time. The shift amount determination portion 9d determines a shift amount of the additional image based on the following speed of the additional image determined by the following speed determination portion 9b, and on the elapsed time calculated by the elapsed time calculation portion 9c. The additional image synthesis portion 9e synthesizes the additional image to the following vehicle image in accordance with the shift amount of the additional image determined by the shift amount determination portion 9d. The display controller 9f displays, on the display device 4, an image produced by synthesizing the additional image to the following vehicle image by the additional image synthesis portion 9e.

An operation of the above configuration is hereinafter described with reference to FIGS. 3 to 9B. The controller 9 constantly monitors whether an event of image update has occurred during operation of the electronic mirror system 1. When determining that an event has occurred on the rear or the side of the vehicle, the controller 9 starts an image update process illustrated in FIG. 3. In response to the start of the image update process, the controller 9 specifies a following vehicle by analyzing an image contained in an imaging signal received from the camera 3, and specifies a distance between the subject vehicle and the following vehicle based on a distance contained in a distance measurement signal received from the range finder 5. The controller 9 further specifies a speed of the subject vehicle, based on a speed included in a speed measurement signal received from the speed meter 6, and specifies an angular speed of the subject vehicle, based on an angular speed included in an angular speed measurement signal received from the angular speed meter 7 (S1).

Subsequently, the controller 9 calculates a shift amount of the specified following vehicle from a previous display position (specified at occurrence of event of previous image update) to the current display position as a shift amount of an object image (S2, first procedure). More specifically, the controller 9 sets a reference point within an object image beforehand, and specifies a coordinate shift distance of the reference point to calculate the shift amount of the object image. After calculation of the shift amount of the object image, the controller 9 determines a following speed of an additional image based on the following speed conversion tables stored in the storage medium 12 (S3, second procedure). More specifically, the controller 9 selects, beforehand, a following speed conversion table for use from the multiple following speed conversion tables stored in the storage medium 12, and determines the following speed of the additional image, based on the selected following speed conversion table. Modes for determining the following speed of the additional image by the controller 9 are hereinafter described with reference to FIGS. 4A to 9B. An example of an object image shifted to the left as viewed from a driver from a state of display of an object image X and an additional image Y connected (joined) to each other at a point P in the display area of the display device 4 will be described. In addition, an example of display of the additional image Y including a vehicle speed of the following vehicle will be described.

Figure 4A:
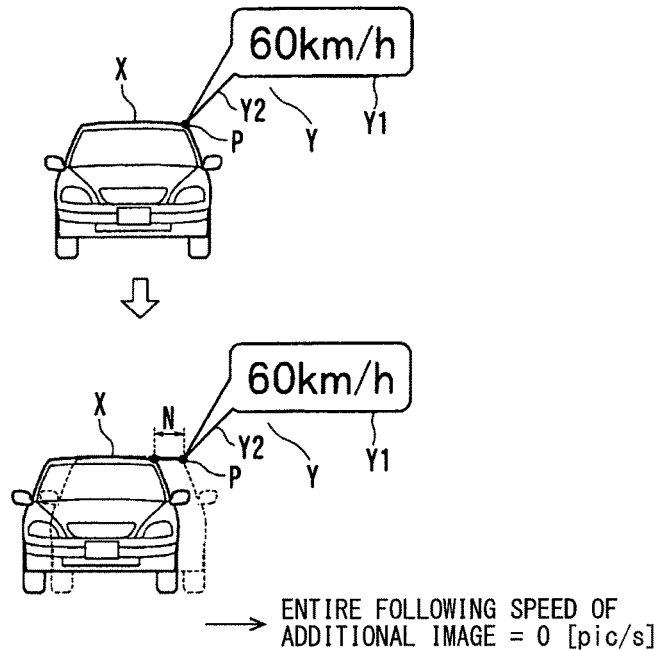
FIG. 4A is a view illustrating a mode for determining a following speed.
Figure 4B:
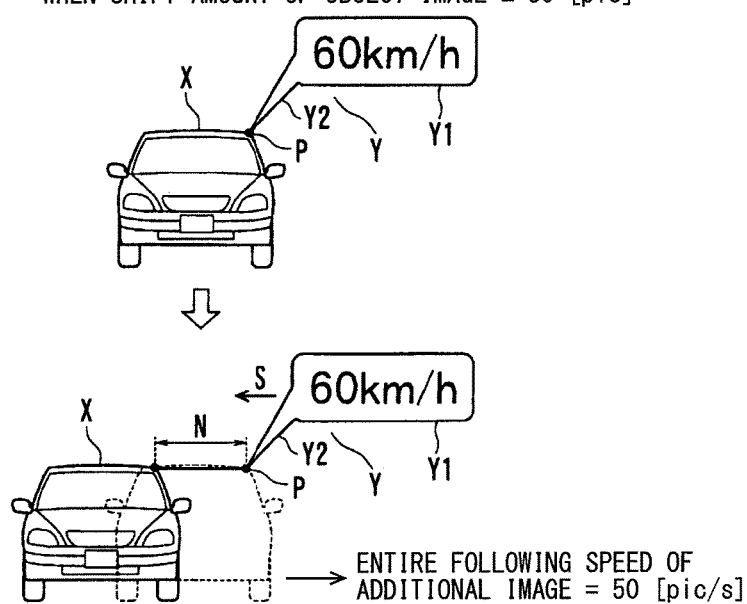
FIG. 4B is a view illustrating a mode for determining a following speed.

As illustrated in FIGS. 4A and 4B, the controller 9 using the following speed conversion table A sets the entire following speed of the additional image Y to 0 [pic/s] when the shift amount of the object image X is smaller than 50 [pic], for example. On the other hand, the controller 9 using the following speed conversion table A sets the entire following speed of the additional image Y to 50 [pic/s] when the shift amount of the object image X is 50 [pic] or larger. As illustrated in FIGS. 5A and 5B, the controller 9 using the following speed conversion table B sets the entire following speed of the additional image Y to 50 [pic/s] when the shift amount of the object image X is 50 [pic], for example. On the other hand, the controller 9 using the following speed conversion table B sets the entire following speed of the additional image Y to 200 [pic/s] when the shift amount of the object image X is 300 [pic].

As illustrated in FIGS. 6A and 6B, the controller 9 using the following speed conversion table C sets the entire following speed of the additional image Y to 50 [pic/s] when the shift amount of the object image X is 50 [pic] or larger in a state that a relative speed is 10 [km/h], for example. On the other hand, the controller 9 using the following speed conversion table C sets the entire following speed of the additional image Y to 200 [pic/s] when the shift amount of the object image X is 50 [pic] or larger in a state that a relative speed is 100 [km/h]. As illustrated in FIGS. 7A and 7B, the controller 9 using the following speed conversion table D sets the entire following speed of the additional image Y to 50 [pic/s] when the shift amount of the object image X is 50 [pic] or larger in a state that an angular speed is 0.02 [rps], for example. On the other hand, the controller 9 using the following speed conversion table D sets the entire following speed of the additional image Y to 200 [pic/s] when the shift amount of the object image X is 50 [pic] or larger in a state that an angular speed is 0.08 [rps].

Figure 9A:
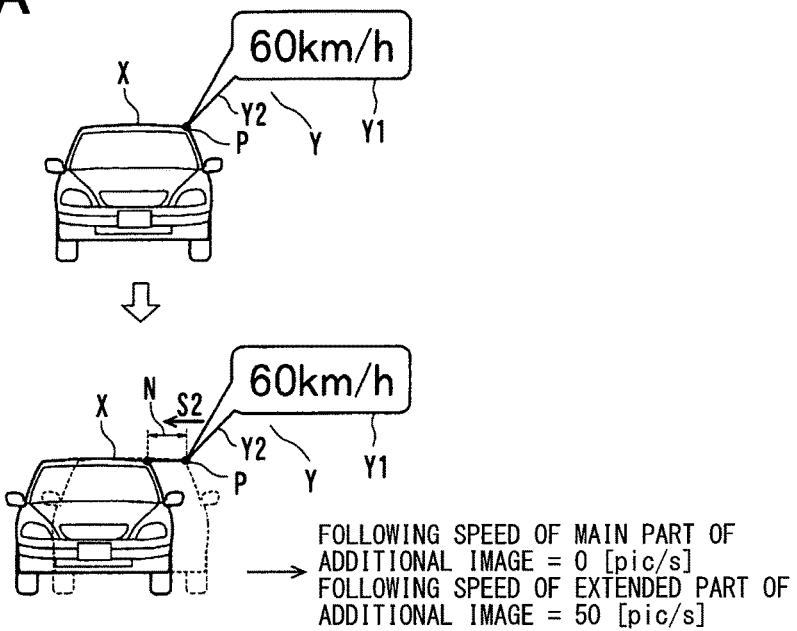
FIG. 9A is a view illustrating a mode for determining a following speed.
Figure 9B:
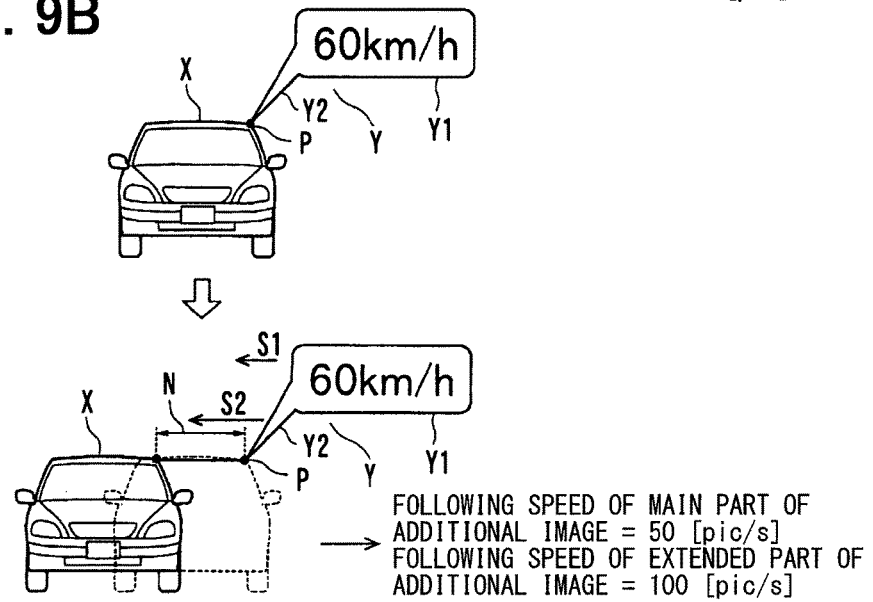
FIG. 9B is a view illustrating a mode for determining a following speed.

As illustrated in FIGS. 8A and 8B, the controller 9 using the following speed conversion table E sets the following speed of a main part Y1 and an extended part Y2 of the additional image Y to 50 [pic/s] and 100 [pic/s], respectively, when the shift amount of the object image X is 50 [pic] or larger, for example. As illustrated in FIGS. 9A and 9B, the controller 9 using the following speed conversion table F sets the following speed of the main part Y1 and the extended part Y2 of the additional image Y to 0 [pic/s] and 50 [pic/s], respectively, when the shift amount of the object image X is 20 [pic], for example. On the other hand, the controller 9 using the following speed conversion table F sets the following speed of the main part Y1 and the extended part Y2 of the additional image Y to 50 [pic/s] and 100 [pic/s], respectively, when the shift amount of the object image X is 50 [pic/s], for example.

Subsequently, the controller 9 calculates an elapsed time from the time of occurrence of the previous image update to the time of occurrence of the current image update (S4, third procedure). After calculation of the elapsed time, the controller 9 multiplies the calculated elapsed time by the following speed of the additional image determined prior to calculation of the elapsed time to determine a shift amount of the additional image (S5, fourth procedure). Thereafter, the controller 9 synthesizes the additional image to the object image in accordance with the determined shift amount of the additional image (S6, fifth procedure). Then, the controller 9 outputs an image signal including a synthetic image of the object image and the additional image to the display device 4, and displays the synthetic image of the object image and the additional image on the display device 4 (S7, sixth procedure).

According to the present disclosure as described above, the following advantageous effects are offered.

A following speed of an additional image is calculated to determine a shift amount of the additional image based on a shift amount of an object image (a following vehicle image) when the object image shifts within a display area of the display device 4 of the electronic mirror system 1. In other words, the following speed of the additional image is determined not uniformly regardless of the shift amount of the object image, but varied in accordance with the shift amount of the object image. In this case, the additional image appropriately follows the object image during display even in such an environment that the object image is shifting. Accordingly, it may be possible to avoid deterioration of visibility for a user. More specifically, a level (intensity) of following display is varied in accordance with the degree of the shift amount of the object image. Accordingly, it may be possible to avoid deterioration of visibility for the user.

At the time of use of the following speed conversion table A, the entire following speed of the additional image is set to 0 [pic/s] when the shift amount of the object image is smaller than 50 [pic]. On the other hand, the entire following speed of the additional image is set to 50 [pic/s] when the shift amount of the object image is 50 [pic] or larger. In this case, it may be possible to avoid a case that the entire additional image shifts with a slight shift of the object image (so-called blurring).

At the time of use of the following speed conversion table B, the entire following speed of the additional image is determined in a range from 50 [pic/s] to 200 [pic/s] such that a proportional relationship is maintained in a range of the shift amount of the object image of 50 [pic] to 300 [pic]. With this, it may be possible to determine the level of the entire following speed of the additional image in accordance with the degree of the shift amount of the object image. At the time of use of the following speed conversion table C, the entire following speed of the additional image is determined in a range from 50 [pic/s] to 200 [pic/s] based on a relative speed of the subject vehicle with respect to the following vehicle, such that a proportional relationship is maintained in a range of the relative speed of 10 [km/h] to 100 [km/h]. In this case, it may be possible to determine the level of the entire following speed of the additional image in accordance with the degree of the relative speed.

At the time of use of the following speed conversion table D, the entire following speed of the additional image is determined in a range from 50 [pic/s] to 200 [pic/s] based on an angular speed acting in the traveling direction of the subject vehicle such that a proportional relationship is maintained in a range of the angular speed of 0.02 [rps] to 0.08 [rps]. In this case, the level of the entire following speed of the additional image is determinable in accordance with the degree of the angular speed. At the time of use of the following speed conversion table E or F, different speeds are determined for the main part and the extended part of the additional image. In this case, it may be possible to avoid such a difficulty that at least the main part of the additional image shifts with a slight shift of the object image (so-called blurring).

The present disclosure is not limited to the embodiment described herein, but may be modified or extended as in the following manners.

The present disclosure is applicable to purposes other than applications to vehicles, including systems other than the electronic mirror system 1. More specifically, the present disclosure is applicable to any systems used in an environment that an object and an imaging portion for imaging the object constantly move relative to each other.

While the vehicle speed of the following vehicle is displayed as an additional image in the present disclosure, information other than the vehicle speed of the following vehicle, such as a warning and a guideline, may be displayed.

A combination of several following speed conversion tables may be used. For example, a relative speed of the subject vehicle to the following vehicle, and an angular speed acting in the traveling direction of the subject vehicle may be synthesized to determine a following speed of an additional image.

The present disclosure may be provided in various types of forms, such as a non-transitory storage medium storing an image display control program, and an image display control program product retained in a non-transitory tangible computer readable recording medium.

It is noted that a flowchart or the processing of the flowchart in the present application includes multiple steps (also referred to as sections), each of which is represented, for instance, as S1. Further, each step can be divided into several sub-steps while several steps can be combined into a single step.

While various embodiments, configurations, and aspects of the image display control apparatus, the electronic mirror system, and the image display control program have been exemplified, the embodiments, configurations, and aspects are not limited to those described above. For example, embodiments, configurations, and aspects obtained from an appropriate combination of technical elements disclosed in different embodiments, configurations, and aspects are also included within the scope of the present disclosure.

What is claimed is:

1. An electronic mirror system comprising:
an image display control apparatus;
an imaging portion that captures an image around a vehicle, and outputs the captured image to the image display control apparatus; and
a display portion that displays an image received from the image display control apparatus,
wherein
the image display control apparatus comprising:
a shift amount calculation portion that calculates a shift amount of an object image that shows an object within an image captured by the imaging portion, the shift amount being an amount of a shift of the object image within a display area of the display portion for a predetermined elapsed time;
a following speed determination portion that determines a following speed of an additional image for the object image, the following speed being determined based on the shift amount of the object image calculated by the shift amount calculation portion;
an elapsed time calculation portion that calculates the elapsed time;
a shift amount determination portion that determines a shift amount of the additional image based on the following speed of the additional image determined by the following speed determination portion and on the elapsed time calculated by the elapsed time calculation portion;
an additional image synthesis portion that synthesizes the additional image to the object image in accordance with the shift amount of the additional image determined by the shift amount determination portion; and
a display controller that allows the display portion to display a synthetic image produced by synthesizing the additional image to the object image by the additional image synthesis portion, wherein
the following speed determination portion sets the following speed of the additional image to zero when the shift amount calculated by the shift amount calculation portion is smaller than a predetermined amount and
the following speed determination portion sets the following speed of the additional image to an amount other than zero when the shift amount calculated by the shift amount calculation portion is equal to the predetermined amount or larger.

2. The electronic mirror system according to claim 1, wherein:
the following speed determination portion variably determines the following speed of the additional image in accordance with the shift amount calculated by the shift amount calculation portion when the shift amount is the predetermined amount or larger.

3. The electronic mirror system according to claim 1, wherein:
the following speed determination portion variably determines the following speed of the additional image in accordance with a relative speed of a subject apparatus with respect to the object when the shift amount calculated by the shift amount calculation portion is the predetermined amount or larger.

4. The electronic mirror system according to claim 1, wherein:
the following speed determination portion variably determines the following speed of the additional image in accordance with an angular speed acting on a subject vehicle when the shift amount calculated by the shift amount calculation portion is the predetermined amount or larger.

5. The electronic mirror system according to claim 1, wherein:
the following speed determination portion determines the following speed of the additional image is partially different in the additional image when the shift amount calculated by the shift amount calculation portion is the predetermined amount or larger.

6. A computer-readable non-transitory storage medium that stores an image display control program causing a controller of an image display control apparatus in an electronic mirror system comprising:
an imaging portion that captures an image around a vehicle, and outputs the captured image to the image display control apparatus; and
a display portion that displays an image received from the image display control apparatus, to execute:
calculating a shift amount of an object image that shows an object within an image captured by the imaging portion, the shift amount being an amount of a shift of the object image within a display area of the display portion for a predetermined elapsed time;

determining a following speed of an additional image for the object image, the following speed being determined based on the calculated shift amount of the object;

calculating the elapsed time;

determining a shift amount of the additional image based on the determined following speed of the additional image and on the calculated elapsed time;

synthesizing the additional image to the object image in accordance with the determined shift amount of the additional image; and allowing the display portion to display a synthetic image produced by synthesizing the additional image to the object image, wherein the following speed of the additional image is set to zero when the calculated shift amount is smaller than a predetermined amount and the following speed of the additional image is set to an amount other than zero when the calculated shift amount is equal to the predetermined amount or larger.

\* \* \* \* \*